Figure 2:
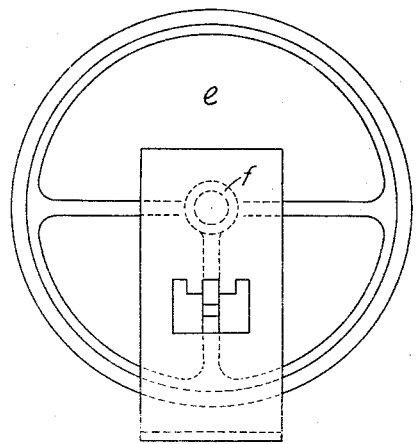

Nov. 9, 1937.　　　　　F. SAAR　　　　2,098,597
VARIABLE CONDENSER
Filed Aug. 4, 1934

INVENTOR
FRANZ SAAR
BY
ATTORNEY

Patented Nov. 9, 1937

2,098,597

UNITED STATES PATENT OFFICE 2,098,597

VARIABLE CONDENSER

Franz Saar, Berlin, Germany, assignor to Telefunken Gesellschaft für Drahtlose Telegraphie m. b. H., Berlin, Germany, a corporation of Germany Application August 4, 1934, Serial No. 738,458
In Germany August 11, 1933

6 Claims. (Cl. 175—41.5)

This invention relates to an improved variable condenser and more particularly to a rotatable condenser of the solid dielectric type.

In the art of radio broadcasting it is desirable, for reasons of saving space to have variable condensers of possibly small dimensions. In order to accomplish this, in place of air condensers, such having a solid dielectric for instance glass, mica, or hard paper are used. Due to the higher constant of the dielectric the size of condensers for the same end capacity could be considerably reduced. During the operation many disadvantages are then found to exist. Glass as the dielectric is readily fragile at the required small wall thicknesses. Mica has the disadvantage that it easily splinters and is relatively quickly worn off. The produced mica powder easily causes "sticking" of the condenser. Hard paper causes too many losses.

In accordance with the invention it is therefore proposed to use as the dielectric iron free magnesium silicate introduced into the art in recent times under the various names (Calit, Calan, steatite, etc.). Besides having low electrical losses and a high dielectric constant these products have the advantages of great hardness so that the surface wearing is avoided, and they furthermore have a favorable property as regards working them, so that it is possible to produce disks of 0,1 mm. thickness. By means of such thin disks the capacity values of about 500/M.MF as ordinarily required in the art of radio broadcasting, can be attained by only two conductive layers provided on surfaces not facing each other of plates touching each other.

An embodiment of the invention is shown by way of example in the drawing.

Figure 1:
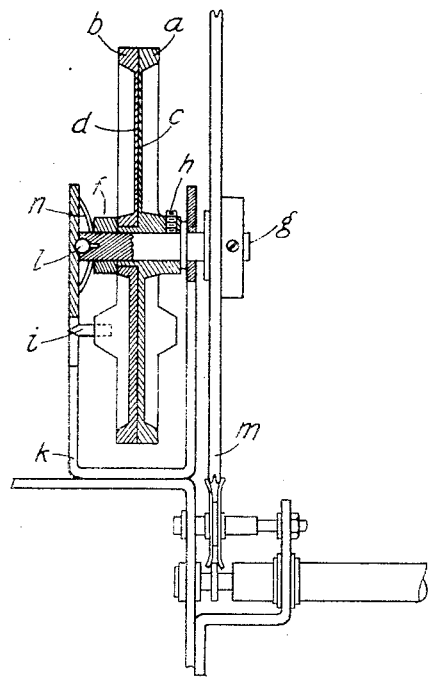

Figure 1 shows a section through a mounted variable condenser.

Figure 2 shows a top view of one of the two supports for the conductive layer. $a$ is the rotor, $b$ the stator. Rotor and stator consist of disk shaped round bodies of equal type and formed of magnesium silicate. At the places $c$ and $d$ recesses in the material are in the surface of a half circle so that at these places a wall thickness of 0,1–0,2 mm. is obtained. At the surface $e$ thus produced (see Figure 2) the conductive layer is disposed suitably by burring it into the di-electric material. The parts of the disk not covered by the conductive layer are likewise provided with recesses, but the wall thickness may here be left greater, so that the rotor plate is approximately or completely balanced. In the center of the disk, hubs $f$ are provided by means of which a fastening to the drive shaft $g$ can be accomplished, whereby the rotor plate $a$ is fixedly secured to the shaft by means of a set screw $h$, while the stator plate $b$ is not fastened to the shaft but is fixedly maintained relative to the condenser casing $k$ by means of a bent part $i$. The shaft $g$ at the one end thereof is journaled on a ball in the casing, while the other end protrudes from the casing and carries at this place the drive disk $m$. By means of a spring $n$, rotor and stator are pressed in intimate contact against each other. The conductive layers may obviously be of any shape as is known for attaining definite effects. Thus for obtaining the entire variation at a rotation of 90° they may be formed of two diametrically disposed quadrants.

I claim:

1. Variable condenser, in particular rotatable condenser having two conductive layers of different polarity displaceable with respect to each other, characterized in that the conductive layers are provided on faces remote from each other of plates consisting of iron free magnesium silicate, said plates gliding over each other in intimate contact.

2. Condenser according to claim 1, characterized in that the carriers for the conductive layers have a reduced wall thickness necessary for reaching the final value of the capacity, only at the places at which a layer is present.

3. A variable condenser of the rotatable type having two conductive layers of different polarity displaceable with respect to each other, characterized in that the conductive layers are provided on a portion of the faces remote from each other of plates consisting of iron free magnesium silicate, said plates guided over each other in intimate contact.

4. A variable condenser of the rotatable type having two conductive layers of different polarity displaceable with respect to each other, characterized in that the conductive layers are provided on faces remote from each other of plates consisting of iron free magnesium silicate, the thickness of said plates at the portion where said layers are arranged being such that the rotatable plate is substantially balanced in all positions, said plates guided over each other in intimate contact.

5. A variable condenser of the rotatable type having two conductive layers of different polarity displaceable with respect to each other, characterized in that the conductive layers are provided on faces remote from each other of plates consisting of insulating material, said plates gliding over each other in intimate contact.

6. A variable condenser according to claim 5 characterized in that the carriers for the conductive layers have a reduced wall thickness necessary for reaching the final value of the capacity, only at the places at which a layer is present.

FRANZ SAAR.